United States Patent [19]

Kagawa et al.

[11] Patent Number: 5,593,592

[45] Date of Patent: Jan. 14, 1997

[54] BIODEGRADATION PROCESS FOR TREATING ORGANIC WASTEWATER

[76] Inventors: Haruo Kagawa, 13-29 Inouecho; Eiichiro Nakayama, 18-13 Miyonowakicho, both of Kyoto-shi Kyoto-fu; Fumihiko Yoshimura, 34-5 Sobata, Aza, Shimohei-gun Iwate, all of Japan

[21] Appl. No.: 356,868

[22] Filed: Dec. 15, 1994

[30] Foreign Application Priority Data

Dec. 16, 1993 [JP] Japan .................................. 5-344444
Nov. 24, 1994 [JP] Japan .................................. 6-315680

[51] Int. Cl.$^6$ ...................................... C02F 1/52
[52] U.S. Cl. ................... 210/611; 210/610; 210/631; 210/667; 210/714; 210/903; 210/916
[58] Field of Search ................... 210/631, 610, 210/611, 624, 702, 710, 711, 723, 667, 714, 903, 916

[56] References Cited

U.S. PATENT DOCUMENTS

| | | | |
|---|---|---|---|
| 2,858,269 | 10/1958 | Harwood et al. | 210/702 |
| 3,627,679 | 12/1971 | Fuller | 210/711 |
| 3,901,804 | 8/1975 | Ohuchi et al. | 210/711 |
| 3,928,191 | 12/1975 | Belasco | 210/631 |
| 4,614,587 | 9/1986 | Andersson et al. | 210/631 |
| 4,632,759 | 12/1986 | Andersson et al. | 210/631 |
| 4,772,307 | 9/1988 | Kiss et al. | 210/631 |
| 4,826,601 | 5/1989 | Spratt et al. | 210/631 |
| 4,956,093 | 9/1990 | Pirbazari et al. | 210/631 |

FOREIGN PATENT DOCUMENTS 60-94197  5/1988  Japan .................................. 210/631

*Primary Examiner*—Peter A. Hruskoci
*Assistant Examiner*—Theodore M. Green
*Attorney, Agent, or Firm*—Cohen, Pontani, Lieberman, Pavane; Christa Hildebrand

[57] ABSTRACT

A low concentration (0.1 to 0.5 mM) of aluminum ions is added to an organic wastewater to selectively raise specific bacteria which can grow without producing unpleasant odors. The bacteria is used for treating the organic wastewater of high density without producing odors thus contributing to the minimum size of a wastewater treatment system. Then, increase of the aluminum ions to a high concentration (more than 4 mM) accelerates flocculation and precipitation of the bacteria for disposal. When a proper mineral is added to the wastewater, a lower concentration (more than 1 mM) of the aluminum ions can encourage the flocculation and precipitation of the bacteria and also, a resultant sludge will be reduced in amount for ease of maintenance.

7 Claims, 15 Drawing Sheets swine waste and quality of treated water

| Item | effluent(without dilution) | treated water |
|---|---|---|
| P H | 7.4 | 6.8 |
| B O D (mg/l) | 8000 | 20 |
| C O D (mg/l) | 2400 | 100 |
| S S (mg/l) | 1700 | 20 |
| nitrogen(mg/l) | 1300 | 100 |
| phosphorus(mg/l) | 125 | 15 |
| colibacilli number/ml | $6 \times 10^4$ | 18 |

FIG. 18

BIODEGRADATION PROCESS FOR TREATING ORGANIC WASTEWATER

BACKGROUND OF THE INVENTION

1. Field of the Invention

The present invention relates to a method of decomposing organic matter in wastewater by means of the action of specific microorganisms and more specifically, a biological process for treating organic wastewater with the use of aluminum hydroxide films.

2. Description of Related Art

For treating a particular wastewater, e.g. domestic or sanitary sewage, livestock waste, and industrial runoff, which contains a substantial amount of organic matter (and is thus referred to as organic wastewater), a variety of methods have been proposed including physio-chemical treatment and biological treatment. The activated sludge process is more widely used as the most common biological treatment than any physiochemical treatment for treating such organic wastewater having high BOD (Biochemical Oxygen Demand).

The activated sludge process comprises raising bacteria in an organic wastewater, decomposing organic matter by the action of the bacteria, and settling the bacteria to a form of adhesive floc to obtain a clear supernatant water.

Although the activated sludge process is effective for treating the organic wastewater, it requires a sizable system or facility for real operation. Also, highly condensed wastewater (more than 2,000 ppm of BOD) has to be diluted with a large amount of water before the treatment. The removal of sludge produced by the treatment has to be repeated a considerable number of times, thus increasing the overall cost. Furthermore, the activated sludge process produces unpleasant odors which may cause a public nuisance.

SUMMARY OF THE INVENTION

It is an object of the present invention to solve the foregoing drawbacks of the conventional biological method such as activated sludge process, to provide a novel biodegradation process of treating organic wastewater in which the organic wastewater is treated without producing unpleasant odors, even if the organic wastewater is highly condensed, it is treated without dilution; the resultant sludge of biotic flocs is minimized, and a large amount of the wastewater is treated with a relatively small system.

For achievement of the above object of the present invention, a biodegradation process of treating an organic wastewater is characterized in that aluminum ions are added to the wastewater so that their concentration is from 0.1 to 0.5 mM/liter for the decomposition of organic matter in the wastewater.

In action, as the concentration of aluminum ions in the organic wastewater is maintained from 0.1 mM to 0.5 mM/liter, odor-producing bacteria which are activated during the decomposition of organic matter in the conventional activated sludge process are flocculated and precipitated so that specific bacteria producing no odors are selectively raised. The specific bacteria are then used for decomposing the organic matter in the wastewater without producing unpleasant odors. The specific bacteria, unlike the known bacteria increased in the conventional activated sludge process, can be proliferated to a high concentration in the wastewater. Accordingly, even if the organic wastewater is highly condensed, it need not be diluted prior to the biological treatment. This allows a wastewater treatment system for conducting the process to remain in a minimum size.

The invention relates to a biodegradation process for treating an organic wastewater wherein aluminum ions are added to the wastewater in a concentration of 0.1 to 0.5 mM/liter for accelerating the decomposition of organic matter in the wastewater, and further to a biodegradation process for treating an organic wastewater wherein more of the aluminum ions are added so that their concentration is increased to more than 4 mM/liter in the wastewater after the decomposition.

The increase of the aluminum ion concentration permits the bacteria raised and increased by the invented method to be flocculated and trapped within aluminum hydroxide films to form bacteria structures which are easily separated and precipitated to the bottom. As a result, when the increased bacteria have been precipitated and removed, the supernatant becomes clear, thus satisfying the requirements of water quality standards.

The invention further provides for a process wherein pieces of a mineral, e.g. zeolite, are added to the organic wastewater during the biodegradation process.

In action, the specific bacteria, selectively raised with a low concentration of aluminum ions, are intimately mixed with the mineral pieces and trapped together in the aluminum hydroxide films with no need of highly concentrated aluminum ions. As the result, flocculent precipitates of the bacteria are increased in structural strength for suffering no fracture during the aeration. After the bacteria precipitates resulting from the decomposition of the organic matter in the wastewater are removed, a supernatant remains clear, thus conforming to water quality standards. The bacteria precipitates are solid and stable in mechanical strength. When the bacteria in the precipitates are eliminated by the action of protists, a smaller amount of sludge consisting mainly of the mineral remains. After being refined, the mineral can be reused.

Further, the invention provides for a process of treating organic wastewater wherein more of the aluminum ions are added to the organic wastewater in response to feeding of the mineral so that their concentration is increased to more than 1 mM/liter.

This accelerates the forming of bacteria precipitates by allowing the specific bacteria to be intimately mixed with the mineral pieces and trapped together in the aluminum hydroxide films. Hence, resultant flocculent precipitates of the bacteria will readily be agglomerated for segmentation in the bottom.

It is also provided that an appropriate amount of the aluminum ions are added to the organic wastewater during the biodegradation treatment so that their concentration is maintained between 0.1 mM/liter and 0.5 mM/liter.

When a new supply of the organic wastewater is fed during the decomposition of the organic matter, generation of the odor-producing bacteria is suppressed by the action of 0.1 to 0.5 mM/liter of the aluminum ions. Thus, the specific bacteria are favorably raised to a high concentration, carrying out the biodegradation at high efficiency while requiring no dilution of the organic wastewater.

BRIEF DESCRIPTION OF THE DRAWINGS

FIG. 18 is a table showing the quality characteristics of the wastewater before and after the treatment with a combination of the aluminum ions and the mineral.

DETAILED DESCRIPTION OF THE PREFERRED EMBODIMENT(S)

Figure 1:
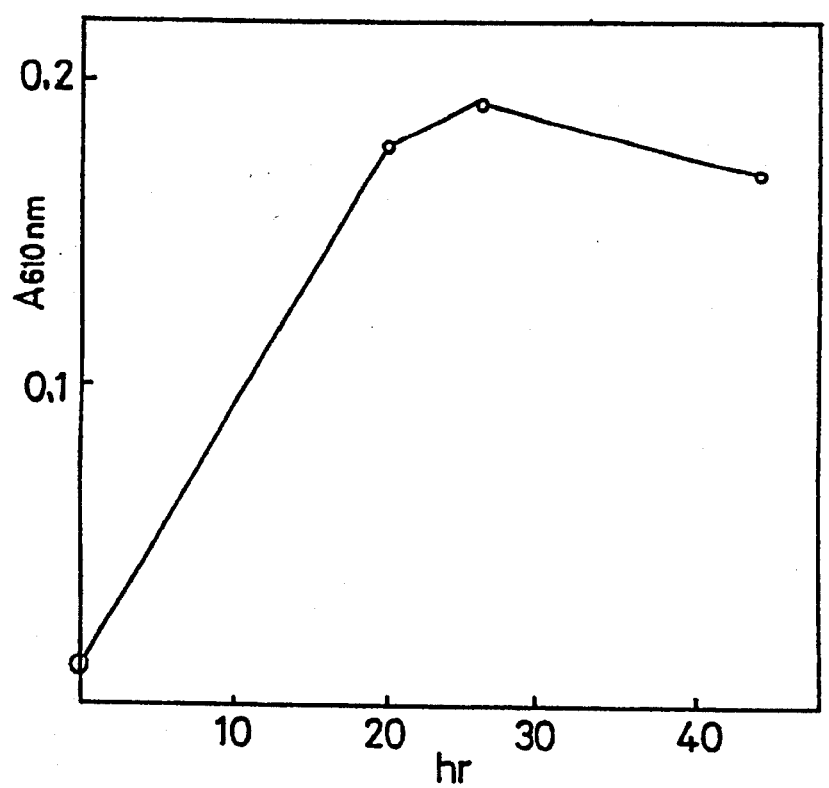
FIG. 1 is a graphic diagram showing the time-dependent growth of bacteria sampled from a sewage water.

Preferred embodiments of a biodegradation process for treating organic wastewater according to the present invention will be described referring to the accompanying drawings.

As explained previously, organic wastewaters are classified as sanitary, livestock, and industrial runoff. For treating such organic wastewaters, a variety of methods have been proposed including physio-chemical treatment and biological treatment. The activated sludge process (the most common biological treatment) is more widely used than any physio-chemical treatment for purifying organic wastewaters. The activated sludge process however has some drawbacks to be overcome. For example, wastewater with a high density (more than 2,000 ppm of BOD) has to be diluted with a large amount of water before the treatment thus requiring a sizable system or facility for the purpose. Also, removal and disposal of sludge produced by the treatment has to be repeated a considerable number of times increasing the overall cost. Furthermore, the activated sludge process produces unpleasant odors which may cause a public nuisance.

The present invention discloses a novel organic wastewater treating method in which specific bacteria are selectively raised for treating a highly condensed wastewater without producing unpleasant odors and a large amount of settled solids or sludge.

It was found that the bacteria produced in the conventional activated sludge process could be settled down with the presence of as little as 0.1 to 0.5 mM/liter or, more preferably, 0.1 to 0.2 mM/liter of aluminum ions. As specific bacteria were selectively obtained and nourished for rapid growth in the presence of aluminum ions, they exhibited some advantageous characteristics.

More particularly, the specific bacteria hardly produced unpleasant odors as compared with the known types of bacteria in the conventional activated sludge process. This means that the bacteria which produce a rotten smell during the decomposition of organic matter are terminated by the action of a low concentration of aluminum ions added to the wastewater in a treatment tank.

Also, it became clear that the specific bacteria were able to absorb and decompose unpleasant odors, such as indole, skatole, P-cresol, etc. Accordingly, the odor and rotten smell from the wastewater in the tank can readily be eliminated. In other words, the wastewater treatment facility is free from the rotten smell produced during the decomposition and the inherent odor of the wastewater. The object of the present invention to eliminate any possible complaint against the unpleasant odor derived from a wastewater treatment facility will thus be achieved by the action of the specific bacteria.

The conventional activated sludge process requires the dilution of a raw wastewater to less than 2,000 to 3,000 ppm for ease of the treatment, thus using a sizable settling tank. The specific bacteria of the present invention selectively raised under the presence of aluminum ions, unlike the known bacteria in the conventional activated sludge process, are capable of rapidly growing in number so that raw wastewater with as a high a density as 10,000 ppm can be treated in a common size of the settling tank.

The biodegradation process for treating organic wastewater of the present invention will now be explained in more detail, in which the rotten smell and inherent odors of wastewater are eliminated by the action of specific bacteria selectively raised using aluminum ions during the treatment, then the bacteria are flocculated and precipitated by the action of a mineral to allow the direct discharge of a resultant supernatant to the environment.

1. Removal of odor-producing bacteria flocculently precipitated with aluminum ions It was observed with a microscope that the bacteria sampled from raw sewage when activated by the conventional activated sludge process were readily increased in number with some being flocculated, as shown in FIG. 1.

As understood, the biological treatment of wastewater is employed for decomposition and removal of organic matter expressed in BOD and COD. Various techniques have been introduced for minimizing the production of resultant solids and for eliminating nitrogen and phosphorus. In the conventional activated sludge process, the bacteria are precipitated and removed from a processing tank. Hence, the bacteria are hardly increased in number in the settling tank. Also, the raw wastewater with high density has to be diluted with amounts of water for ease of the treatment, thus requiring a larger size of the settling tank. The present invention is directed towards minimizing the size of the settling tank by raising specific groups of bacteria for accelerating the treatment.

The present invention is also intended to eliminate rotten smells and inherent odors of settled solids agglomerated in the settling tank during the conventional activated sludge process.

Figure 2:
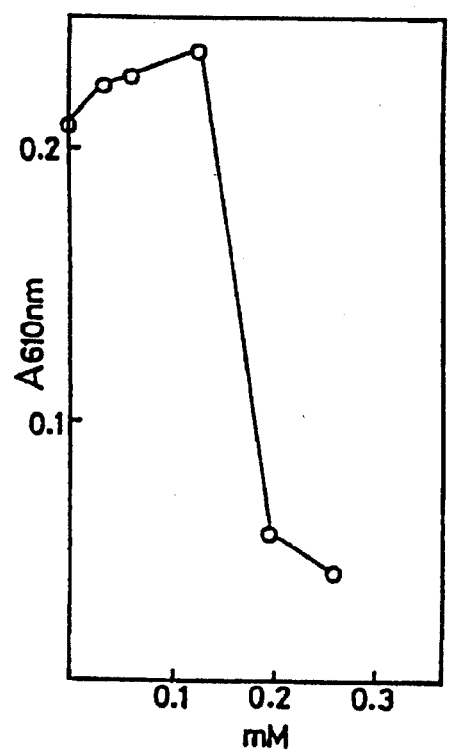
FIG. 2 is a graphic diagram showing the relation between the concentration of aluminum ions and the number of bacteria suspended in a supernatant after addition of the aluminum ions to a culture medium of the bacteria.

When a number of bacteria sampled from sewage and raised in a culture liquid were added with a given amount or slightly higher than 0.1 mM/liter of aluminum ions, they were flocculated and precipitated, as shown in FIG. 2, leaving a clear supernatant. The flocculent precipitate of the bacteria was examined by tinting it with colored aluminum hydroxide. As the result, a portion of the bacteria floc was tinted red while the majority resulting from the conventional activated sludge process remained unchanged. The precipitate portion was found to consist of the bacteria covered with aluminum hydroxide films.

According to the method of the present invention, most of the bacteria sampled from sewage can successfully be precipitated with addition of a low concentration of aluminum ions. After removal of the bacteria precipitates, the remaining water was left to stand at room temperature (of more than 25 degrees centigrade) for a few weeks and observed without producing any unpleasant odor. This indicates that odor-producing bacteria are absent in the remaining water as having been removed in the floc due to the action of aluminum ions. It also proves that the bacteria floc with the aluminum hydroxide prevents the settling tank from producing unpleasant odors.

2. Growth of bacteria with the presence of aluminum ions

An experimental process was conducted using organic wastewater which was prepared by using a 0.5-mm mesh screen to filter swine waste deposited on the floor of a drainboard-type hog yard. 1.8 liters of the organic wastewater was fed into a 20-liter wastewater settling tank. When 0.4 mM/liter of aluminum ions was added, bacteria were flocculated and settled on the bottom of the tank. The precipitates of the bacteria were then aerated in a small amount of the wastewater for one night so as to raise specific bacteria defined by the present invention. The specific bacteria were examined for their growing behavior using different concentrations of the aluminum ions.

Before the examination, each acid solution containing the aluminum ions was shifted to a neutral level of pH by adding NaOH. The solutions having different concentrations of the aluminum ions were measured at equal intervals of an hour with a spectrophotometer for detecting the growth of the specific bacteria.

Figure 3:
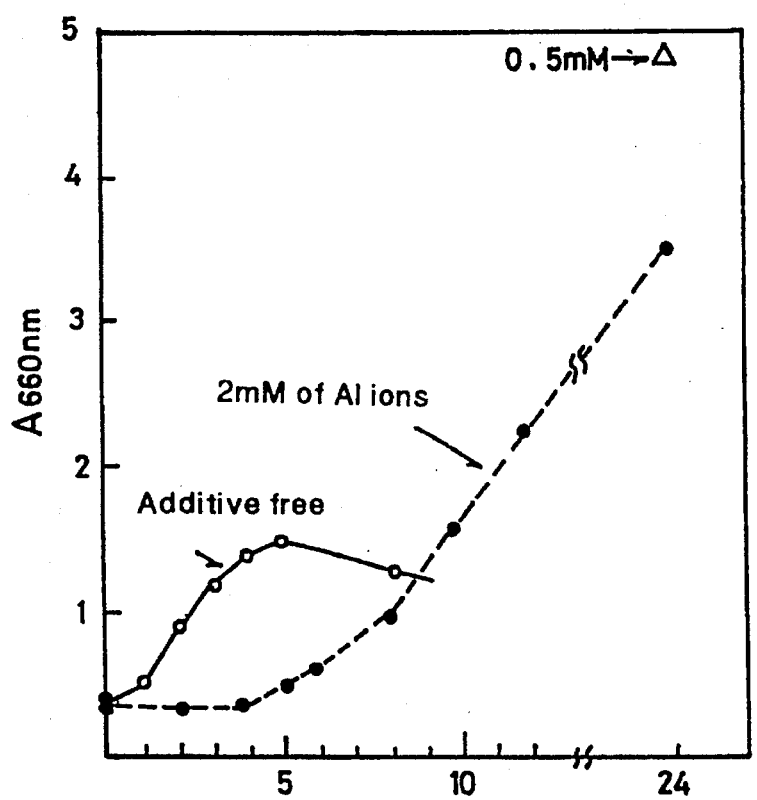
FIG. 3 is a graphic diagram showing the comparison of bacteria growth with 2 mM/liter of aluminum ions and without them.

In a solution containing no aluminum ions, the bacteria were raised, then flocculently precipitated with time as they were found of the known types produced in the conventional activated sludge process. As shown in FIG. 3, the known bacteria stopped growing after four hours and their number was sharply decreased as they had been flocculated.

The bacteria in a solution having 2 mM/liter of the aluminum ions were rarely increased in the first 3 hours, as shown in FIG. 3, but accelerated after 4 hours to a higher level of growth. With 0.5 mM/liter of the aluminum ions, the bacteria grew sharply so that the absorbance of the solution was reduced to 4.8 at a wavelength of 610 nm. At 2 mM/liter and 5 mM/liter, they were raised to 3.4 and 2.3 of the absorbance respectively.

The specific bacteria selectively raised under the presence of aluminum ions by the method of the present invention can be increased easily and rapidly in number when they are nourished with nutriments or enriched wastewater itself, as compared with the known bacteria in the conventional activated sludge process. Accordingly, the highly condensed wastewater will be treated without being diluted.

However, the specific bacteria according to the present invention, unlike the known bacteria in the conventional activated sludge process, are not completely settled and fail to produce a clear supernatant after the treatment. As described above, small structures of the bacteria covered with the alum floe were settled as observed with the microscope but the majority of the bacteria remained suspended in the aluminum ion solution with a low concentration.

It is now taught that the specific bacteria selectively raised with the aluminum ions by the method of the present invention can decompose organic matter in the wastewater of a high TOC. A resultant treated water of the method however remains opaque and unfavorable for direct discharge, as compared with a clear supernatant produced by the conventional activated sludge process. Hence, another technique has been developed by us for removal of the suspended bacteria.

3. Precipitation with high concentration of aluminum ions

As is apparent from FIG. 2, the known bacteria in common sewage are flocculated and precipitated in the activated sludge process when about 0.15 mM/liter of the aluminum ions is added, producing a clear supernatant. The specific bacteria raised under the presence of a low concentration of the aluminum ions are hardly settled when the concentration of the aluminum ions is not increased. In the experiments, they were flocculated partially with 5 mM/liter of the aluminum ions and completely with 7 mM/liter. It may be said that the bacteria flocculated with 0.15 mM/liter of the aluminum ions are changed to different types which are flocculatable only with the aluminum ions of 7 mM/liter or about 50 times higher in concentration.

Some feasible examples of the precipitation with high concentration of aluminum ions according to the present invention will be explained.

1. A wastewater treatment system using the precipitation with high concentration of the aluminum ions is as follows:

(1) Primary treatment

Figure 4:
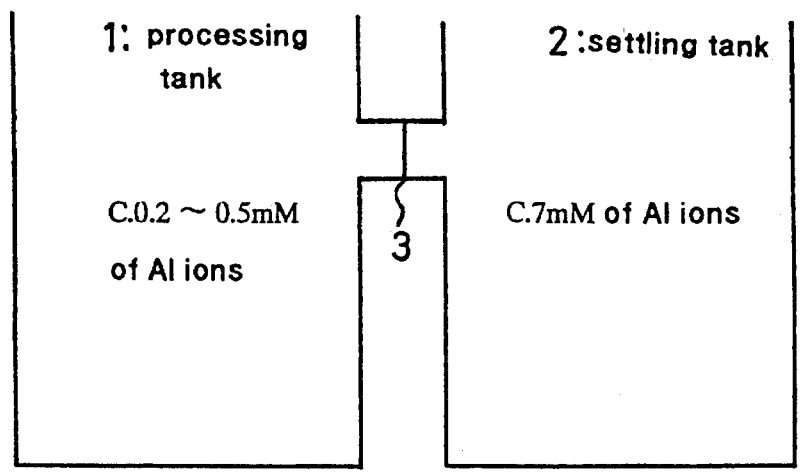
FIG. 4 is a schematic view of a system for executing the wastewater treatment using the aluminum ions.

As shown in FIG. 4, there are a processing tank 1 and a settling tank 2 coupled with each other by an unshown conduit 3. The processing tank 1 is loaded with wastewater to which is then added 0.2 to 0.5 mM/liter of aluminum ions, thus serving as a biodegradation tank. After bacteria are highly raised and activated to decompose organic matter in the biodegradation tank 1, an activated portion of the wastewater is moved to the settling tank 2.

(2) Flocculent precipitation of bacteria

When 7 mM/liter of aluminum ions is fed to the settling tank 2, the bacteria are flocculated and agglomerated in the bottom. Although this example employs 7 mM/liter of the aluminum ions, the present invention is not limited to the example and another concentration of the aluminum ions may be used with equal success. The concentration of the aluminum ions required for optimum flocculation of the bacteria depends on application of a mineral, which will be described later, and may be more than 4 mM/liter or preferably 7 mM/liter when no mineral material is used.

(3) Treatment of supernatant and sludge

After the decomposition of organic matter in the wastewater by the action of the bacteria and the precipitation of the bacteria by the action of a high concentration of aluminum ions are completed, a resultant supernatant becomes clear. The clear supernatant is high enough in quality to conform to the requirements of water quality effluent standards and can thus be discharged to the environment. The remaining sludge (with bacteria) can also be removed for reuse in possible applications.

As described, the foregoing organic wastewater decomposition method using aluminum hydroxide films produces a large amount of sludge. If the bacteria in the sludge are not reused, the sludge has to be disposed of safely. For easing the disposal of the sludge, another wastewater treatment system is provided.

2. A wastewater treatment system employing a combination of bacteria, mineral, and aluminum ions is as follows:

The bacteria are used in combination with a mineral and aluminum ions for treatment of the wastewater.

(1) Wastewater treatment arrangement

Figure 6:
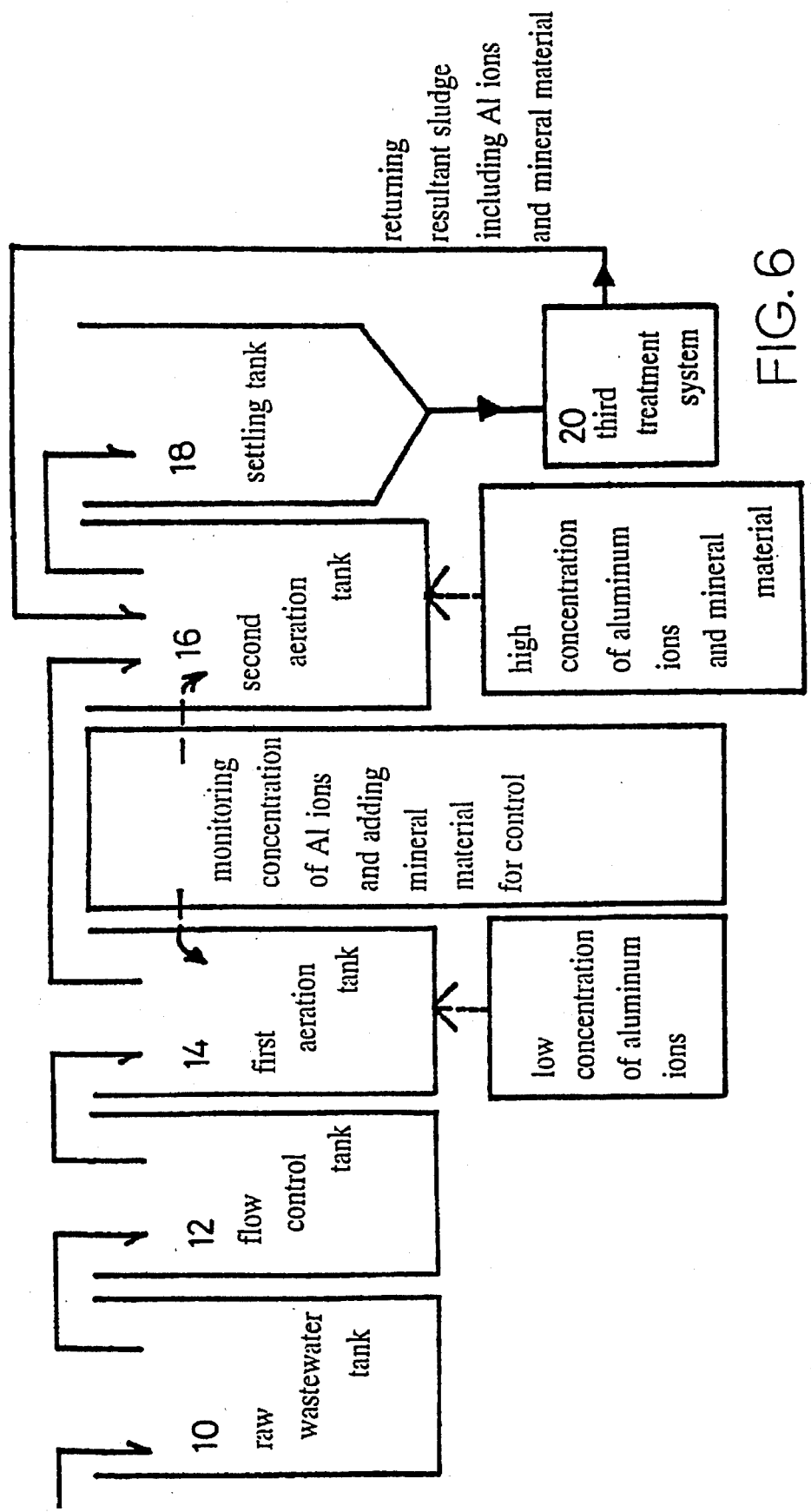
FIG. 6 is a schematic view of a system for executing the wastewater treatment using the aluminum ions and the mineral.

This wastewater treatment system comprises a raw wastewater tank 10, a flow control tank 12, a first aeration tank 14, a second aeration tank 16, a settling tank 18, and a third treatment system 20, as shown in FIG. 6, which are communicated to one another by unshown valve-equipped conduits.

(2) Selection and raising of bacteria

For experiment, a raw wastewater was fed through the raw sewage tank 10 and the flow control tank 12 to the primary aeration tank 14 where it was added with a low concentration of aluminum ions for growing of bacteria. A group of bacteria was selectively raised under the presence of 1 mM/liter of aluminum ions, and added with a mineral material of zeolite 200.

Figure 5:
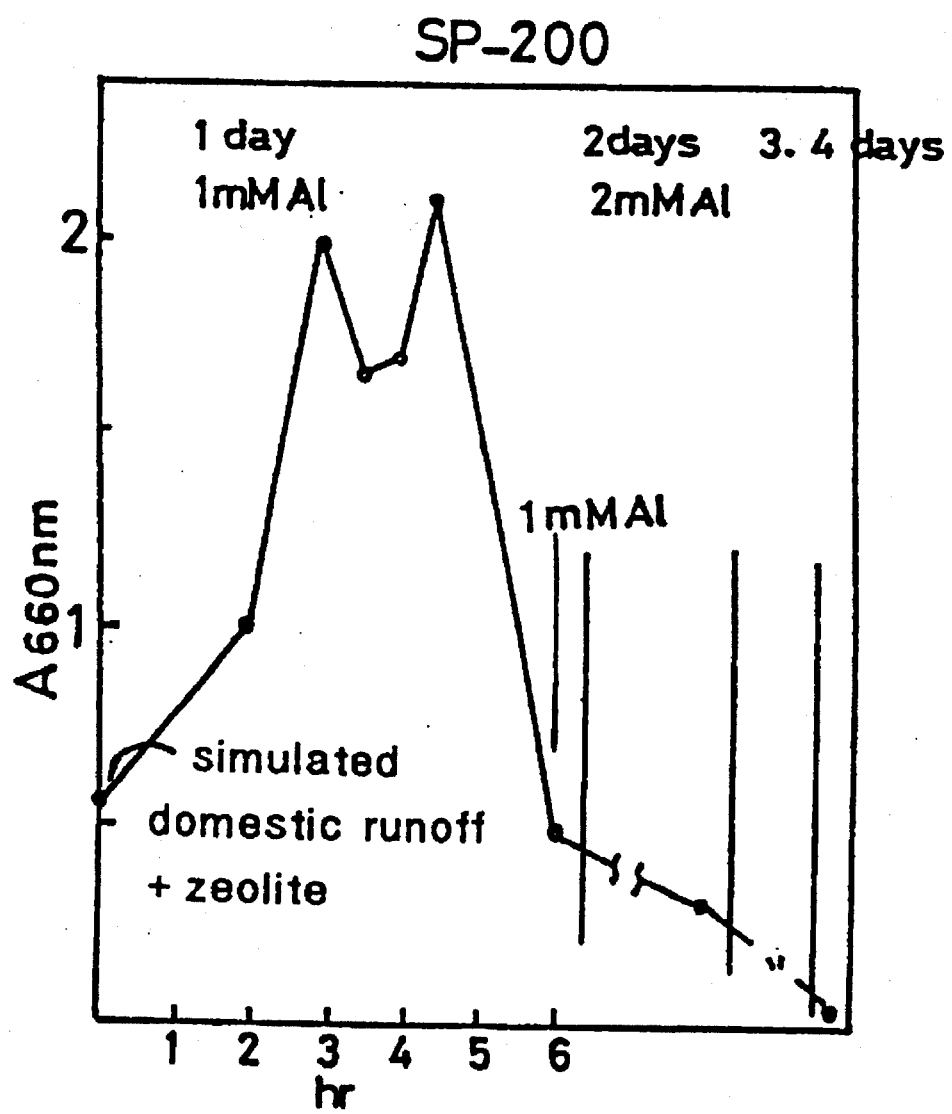
FIG. 5 is a graphic diagram showing the time-dependent change of the bacteria growth after feeding of a mineral.

After an organic wastewater (simulated domestic runoff) which was 1/10 of the raw wastewater was also fed through the raw sewage tank 10 and the flow control tank 12 to the primary aeration tank 14 for aeration, the bacteria grew sharply and within 3 to 5 hours increased to the maximum as shown in FIG. 5. There were then sediments produced in the bottom of the primary aeration tank 14 which looked similar to floes of the known bacteria in the conventional activated sludge process.

Two hours later, the sediments were examined using aluminon. Precipitates of the bacteria covered with aluminum hydroxide films were found as tinted in red by the aluminon. In addition, they were intimately associated with and surrounded by the zeolite 200. As the bacteria precipitates were mixed and protected with shells of the zeolite 200, they had a physical strength increased for standing against mechanical impact. In fact, the bacteria precipitates covered with the aluminum hydroxide films remained unfractured during the aeration.

(3) Flocculent precipitation of bacteria

After 6 hours of further activation, an opaque remaining solution turned to white color was transferred to the secondary aeration tank 16, where 1 mM/liter of aluminum ions were added. Most of the bacteria in the solution were then flocculated and precipitated by the action of the zeolite 200, as shown in FIG. 5. A resultant supernatant still remained slightly opaque, with an absorbance of 0.5 at a wavelength of 660 nm.

The supernatant was continuously aerated using 2 mM/liter of aluminum ions and 2 days later, its absorbance was decreased to 0.3. At the third day, the absorbance was turned to 0.15 and at the fourth day, to 0.04 and the supernatant became transparent. Simultaneously, the precipitates were found consisting mainly of the zeolite 200 while the bacteria had been terminated by protists.

As the bacteria has been terminated by the action of protists, the mineral can be recovered for reuse and the amount of resultant sludge will be reduced. This contributes to the ease and saving of maintenance costs of the wastewater treatment system.

The bacteria which had been raised without addition of the mineral but with a low concentration of the aluminum ions were hardly agglomerated with 2 mM/liter of the aluminum ions. The bacteria were flocculated and precipitated only when the concentration of the aluminum ions was increased to 7 mM/liter. When pieces of the mineral like zeolite 200 were added, they became intimate with the bacteria structures covered with the aluminum hydroxide films. Hence, the bacteria precipitates were easily settled in the bottom of the tank when the aluminum ion concentration was as low as about 1 mM/liter or more, preferably more than 2 mM/liter.

As described above, when a combination of the bacteria, mineral, and aluminum ions is activated in the tank, the bacteria sharply increase in number and after the aeration, a clear supernatant can be obtained. It is also proved that the mineral sediment in the tank has a quality for reuse with absence of the bacteria. Accordingly, the method of the present invention resides in a novel wastewater treatment process with the use of aluminum hydroxide films which is favorably distinguished from the conventional activated sludge process.

The mineral to be applied is not limited to zeolite 200; various minerals may be used with equal success as long as the bacteria are attracted thereto. It is known that an interface between mineral and water provides absorption of microorganisms, concentration or reduction of nutrient, shift of activating energy of microbes, and shortening of induction time of induced enzyme. As specific bacteria are selectively agglomerated by the action of aluminum ions, they are attached to pieces of the mineral. In fact, the bacteria protected with aluminum hydroxide films were successfully merged with mineral components when one selected from agricultural soil, forest soil, sand, and clay was added as substituted for the zeolite 200. Without addition of any one of them, such a result was not observed.

The removal of unpleasant odor from the wastewater treatment tank according to the method of the present invention will now be verified by reviewing the experimental action of a treatment.

A body wastes liquid derived from a livestock firm was fed and aerated in the wastewater treatment tank where the bacteria had been selectively raised under the presence of a low concentration of aluminum ions by the method of the present invention. As the result, its unpleasant odor was eliminated in the tank.

Figure 7:
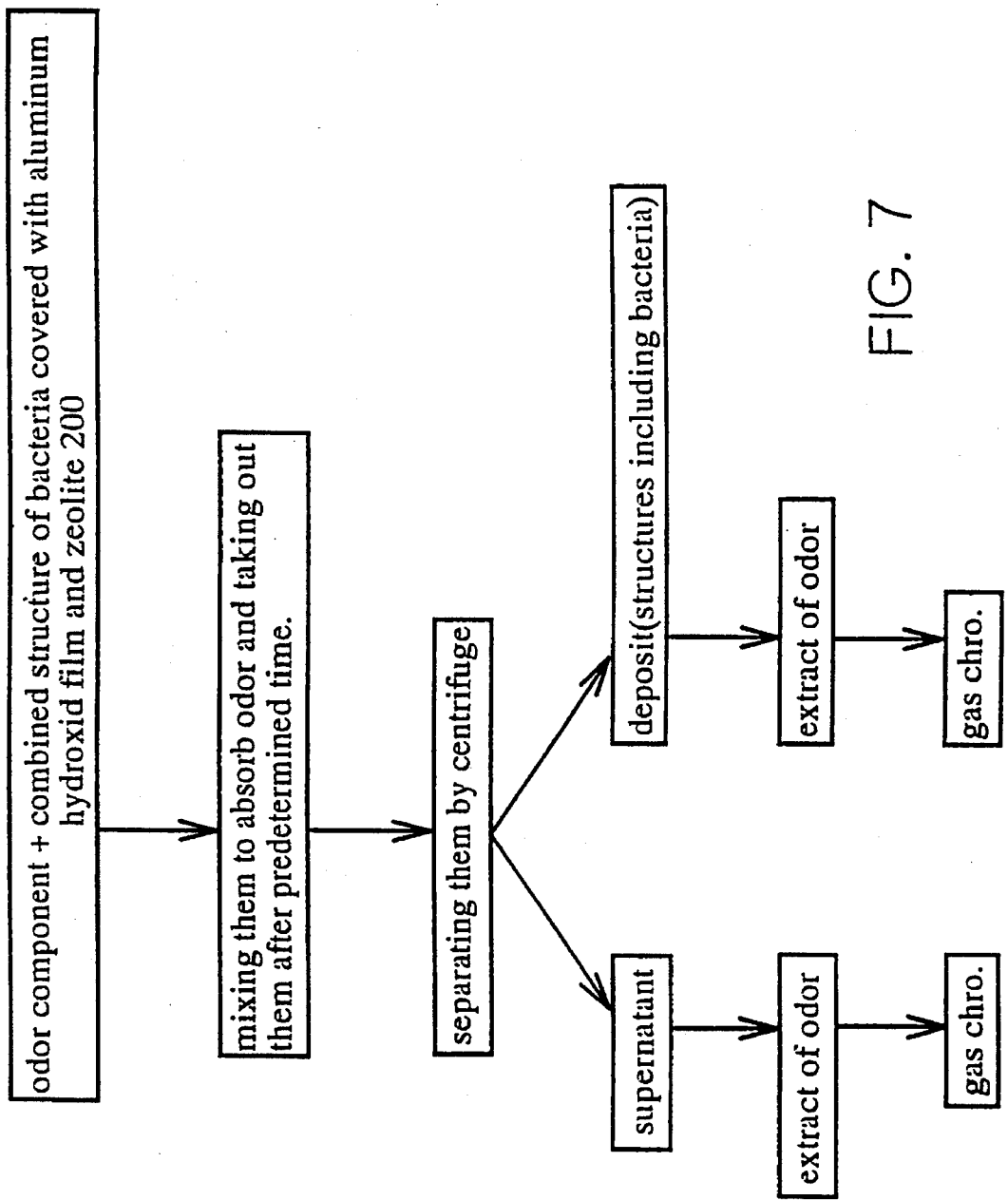
FIG. 7 is a flowchart showing the procedure of analyzing odor components.

For confirmation, a simulated odor was prepared by mixing a neutral odor component (including p-cresol, indole, and scatole) and an acidic odor component (including acetic acid, propionic acid, isobutyric acid, butyric acid, and isovaleric acid). The simulated odor was then fed into the wastewater treatment tank where the bacteria covered with the aluminum hydroxide films are combined with the zeolite 200. The change of the simulated odor with time was examined according to a sequence of steps shown in FIG. 7 and analyzed using a gas chromatograph, Leoplex 400.

Figure 8:
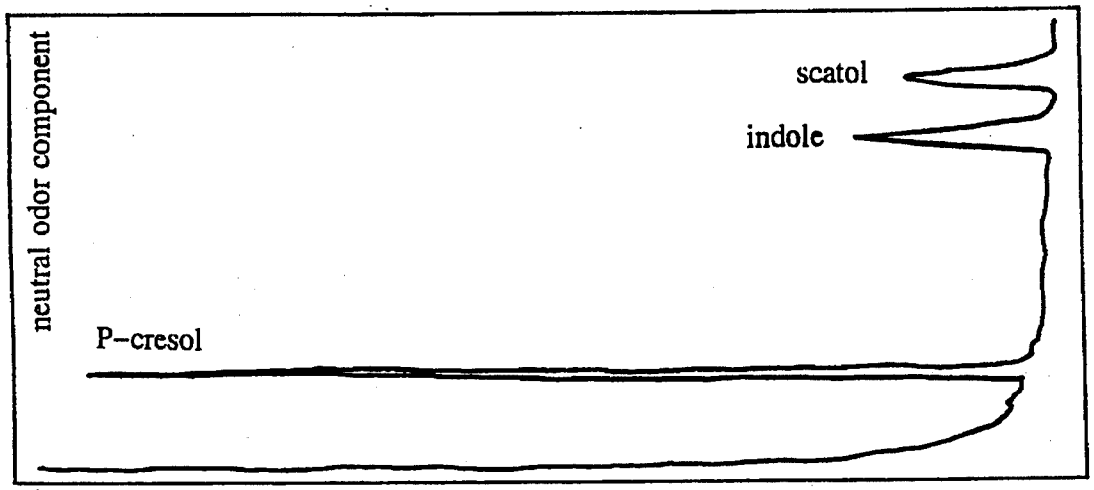
FIG. 8 is a graphic diagram showing the components of a simulated neutral odor.
Figure 10:
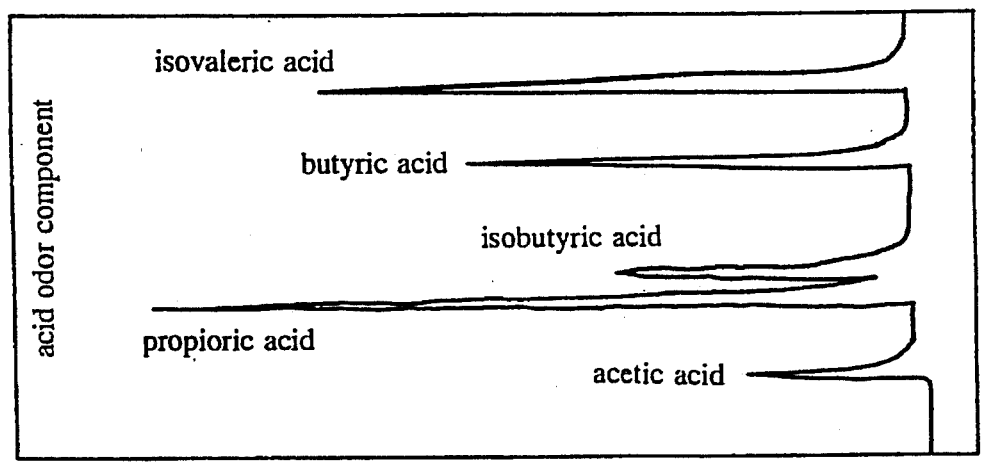
FIG. 10 is a graphic diagram showing the components of a simulated acidic odor.
Figure 9:
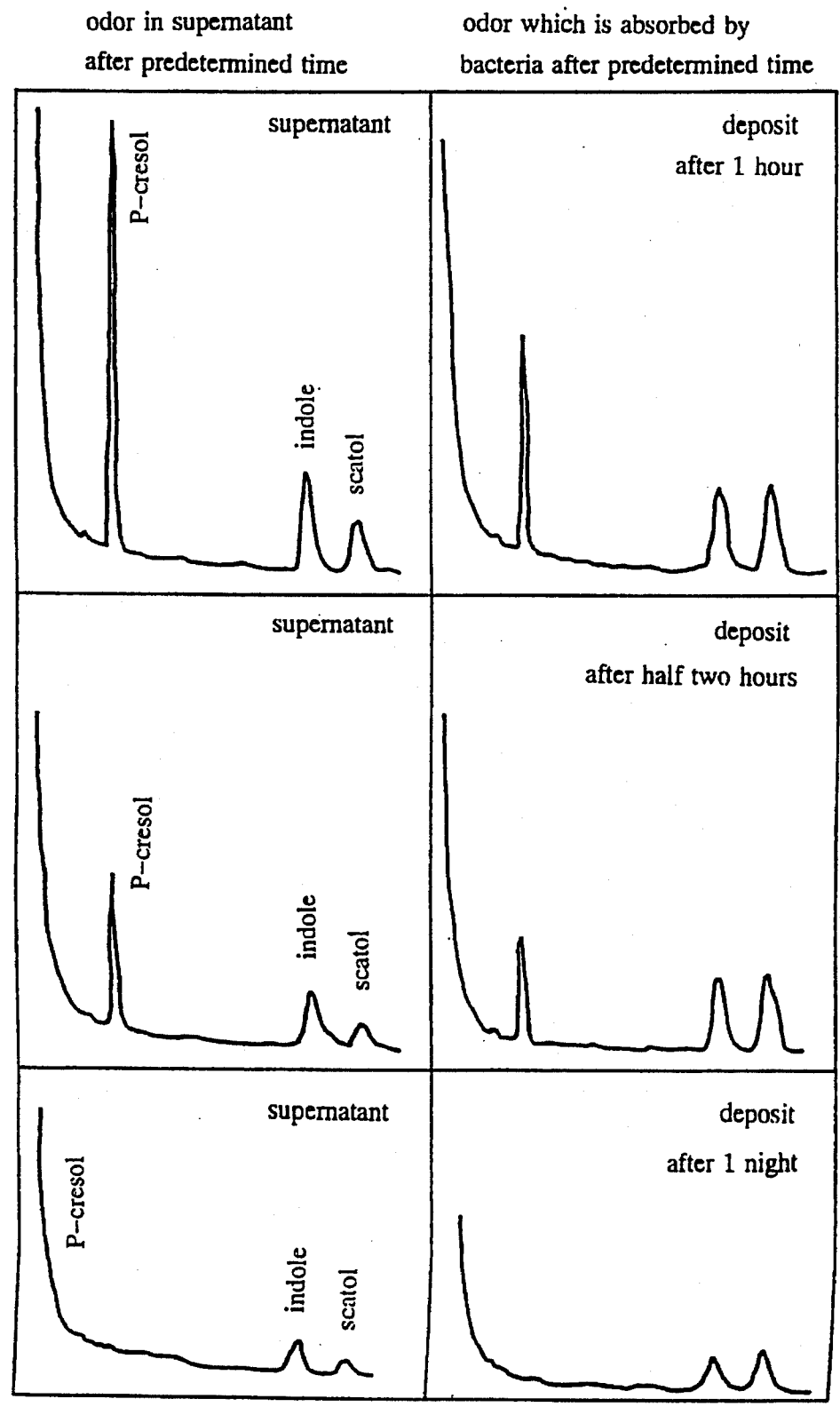
FIG. 9 is a graphic diagram showing the time-dependent change of the components of the simulated neutral odor in both a supernatant and a precipitate.
Figure 11:
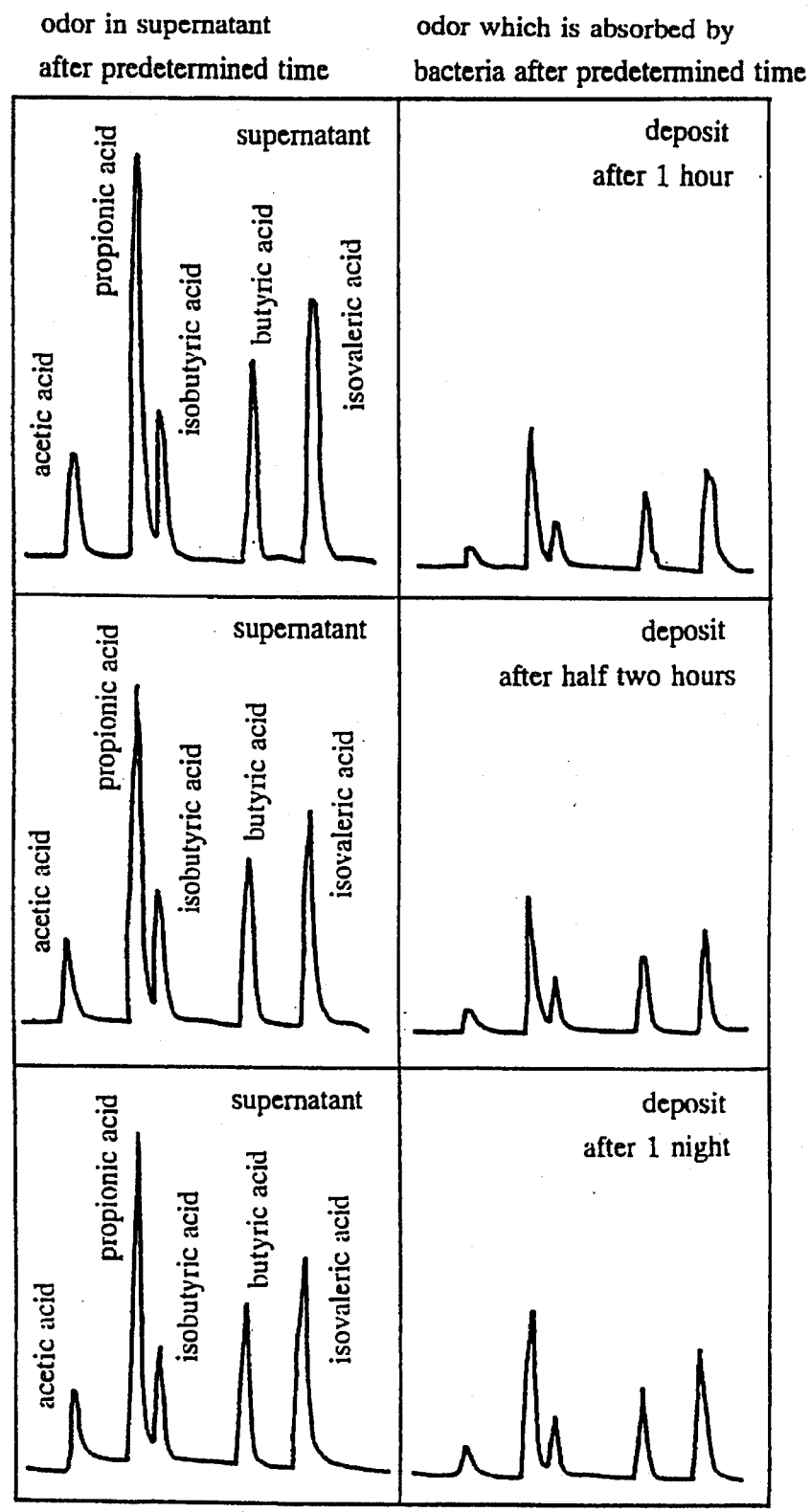
FIG. 11 is a graphic diagram showing the time-dependent change of the components of the simulated acidic odor in both a supernatant and a precipitate.

The results are illustrated in FIGS. 8 to 11. The neutral odor component was precipitated after one hour as separated from a supernatant, as shown in FIGS. 8 and 9. The odor was hardly detected from the supernatant after two hours and completely eliminated after one night. It was apparent that the odor was absorbed and decomposed by the action of the bacteria. As the elimination of the odor was detected by a human organ, it is verified by the analysis of the gas chromatograph. Also, the acidic odor component was absorbed by the precipitates of the bacteria but decomposed at very slow speeds.

Commonly, the unpleasant odor produced in a wastewater treatment plant and perceived by the human organ comprises mainly a neutral odor component. Hence, a majority of the odor derived from body waste can be eliminated by the action of the bacteria selectively raised under the presence of low concentrated aluminum ions by the method of the present invention.

For verification, indole, representing one of the most unpleasant odors, was mixed with the bacteria precipitates produced by the method of the present invention. After a while, its excess was removed using a centrifugal separator. A resultant mixture was tinted with cobac reagent and its precipitates turned red with time. As closely examined with a microscope, the precipitates were mostly tinted red, indicating that their carrying bacteria were capable of absorbing and decomposing the indole.

3. Continuous operation of wastewater treatment in swine farm

An actual process of treating body waste in the treatment tank of a swine farm according to the method of the present invention will now be explained.

A wastewater flow to be treated at a swine farm wastewater treatment plant has as a high TOC as 7,000 to 10,000 ppm.

Figure 12:
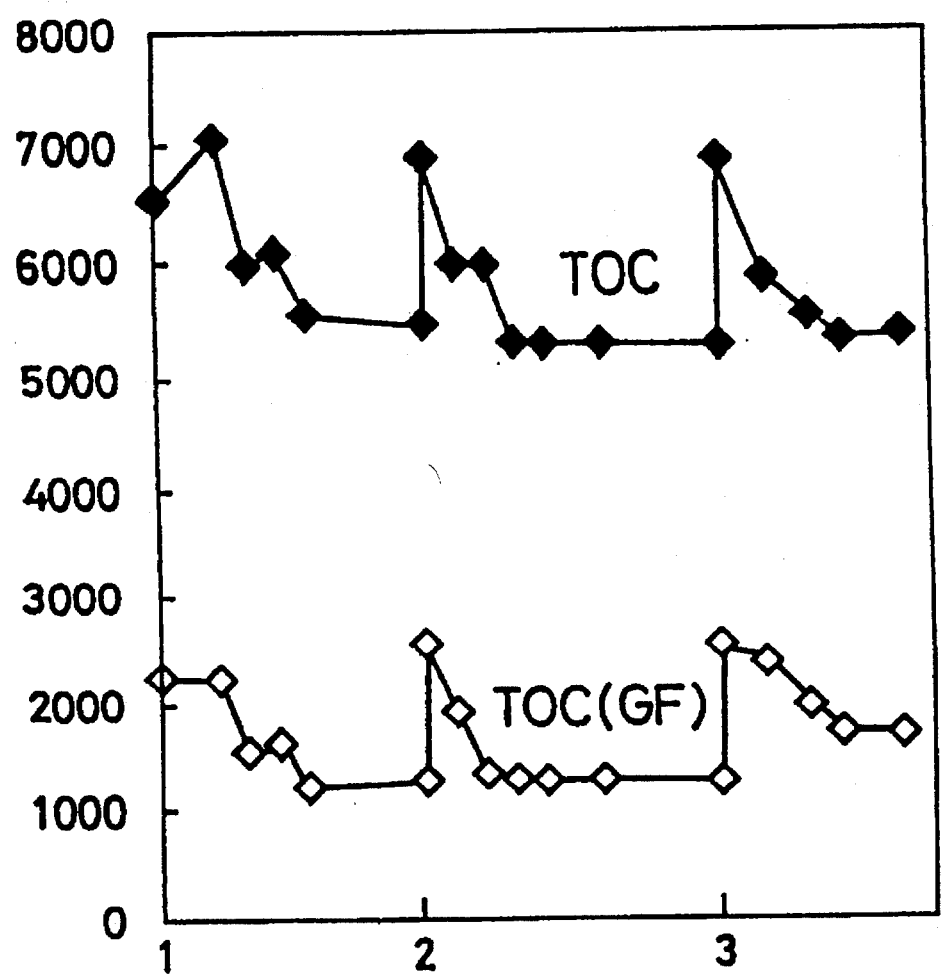
FIG. 12 is a graphic diagram of concentration of total organic carbon (TOC) versus time showing the amounts of bacteria and TOC excluding bacteria over time.

As shown in FIG. 12, the wastewater contains 5,000 to 7,000 ppm of organic matter including about 1,000 ppm of brown-color organic carbon (shown by the baseline curve of TOC(GF) in the figure). When 4,000 ppm of the specific bacteria selectively raised by the method of the present invention are added to the wastewater in the treatment tank, the organic carbon of 1,500 ppm will be decomposed and gasified within two hours. In fact, the organic carbon was increased to 1,500 ppm upon the introduction of a new wastewater flow and then decreased by the action of the bacteria as shown in FIG. 12. As TOC(GF) stands for total organic carbon excluding the bacteria, the graphic diagram of FIG. 12 illustrates cycles of the introduction and the decomposition of organic matter in the treatment tank. As is apparent, the baseline curve of TOC remains low. It is thus verified that the organic matter was decomposed to gaseous substances while the bacteria raised by the method of the present invention were not increased during the decomposition but maintained substantially in a constant number.

Figure 13:
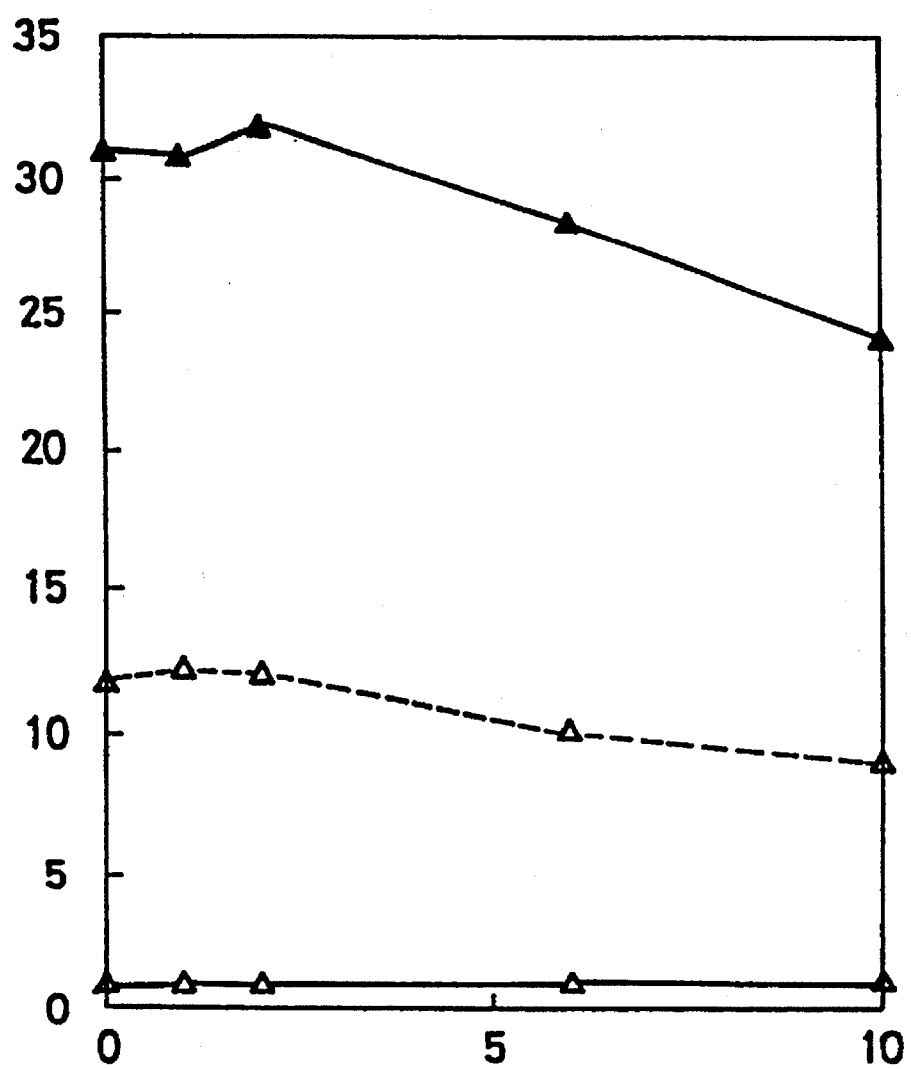
FIG. 13 is a graphic diagram of concentration versus time showing the concentration of the specific bacteria raised by the method of the present invention in the treatment tank over time.

FIG. 13 shows the concentration of the specific bacteria raised by the method of the present invention in the treatment tank. As shown, the concentration is 30 to 32 at A 610 nm indicating that the bacteria or their floc was generated to a considerable level. After the introduction of a wastewater into the treatment tank at 0 hour, the concentration of the bacteria stays at a high level as its variation falls within the range of experimental error. Although the bacteria concentration was substantially increased or decreased in a long-run operation, it remained almost unchanged within two hours after the introduction of wastewater flow during which the organic matter was being decomposed. It is thus understood that a large portion of the organic matter was successfully converted to gaseous carbon dioxide and exhausted to the atmosphere.

Figure 14:
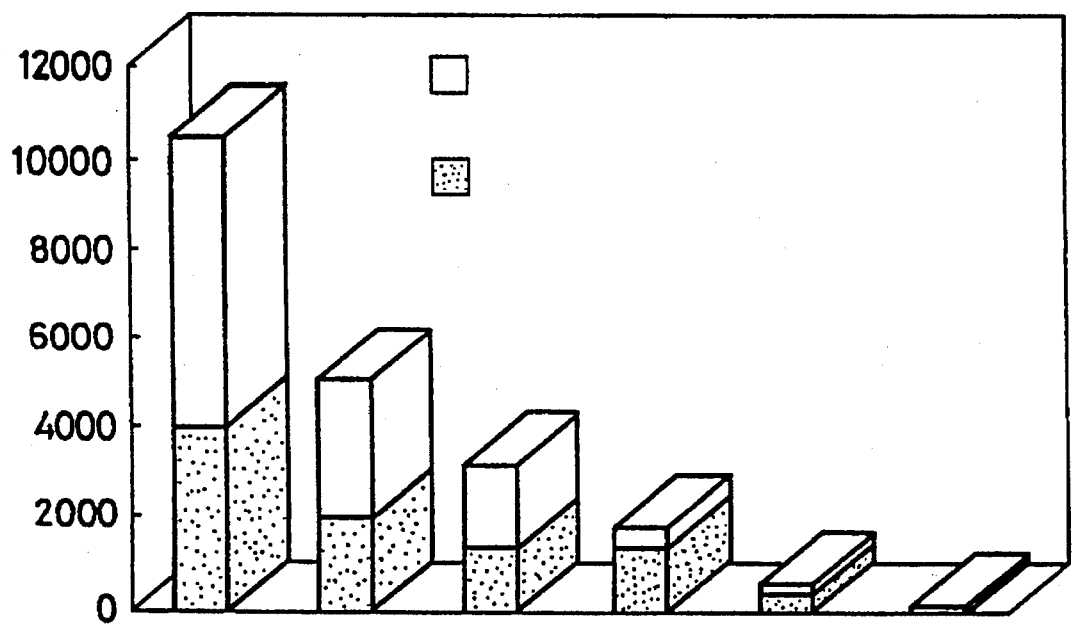
FIG. 14 shows the concentration of TOC consisting of the organic matter and bacteria at each step of the treatment.

FIG. 14 shows the TOC at each step of the treatment consisting of the organic matter and the bacteria. In an experiment, an organic-rich wastewater flow from a swine farm having 10,000 ppm of TOC (or 20,000 ppm of BOD) was fed and readily subjected to biodegradation in the wastewater treating tank by the action of the bacteria according to the method of the present invention without being diluted at preparation. The wastewater was transferred from a raw sewage tank to a flow control tank for aeration, as shown in FIG. 14. When the organic matter had been decomposed at each aeration step by the action of the specific bacteria, the organic carbon in the wastewater was decreased from 10,460 ppm to 490 ppm at the settling tank. As the organic carbon was decreased, the bacteria were also reduced in number after the decomposition of the organic matter. After the treated wastewater from the settling tank was filtered, its filtrate was found containing 449 ppm of a suspended organic carbon which consisted mainly of brown-color matter of which BOD was zero. According to the method of the present invention, the organic matter is decomposed and converted to carbon dioxide, water, and nitrogen gas (and/or nitrous oxide). Hence, the amount of resultant sludge produced by the treatment of a highly condensed wastewater will be much less than that of the conventional activated sludge process. In addition, the filtrate of liquid form was left for removal of excessive bacteria and returned back to the swine farm which in turn stopped producing unpleasant odors.

4. Brown-color matter (phenolic compounds) in the tank

The treated wastewater produced by the aluminum ion method of the present invention is brown in color as brown-color matter is suspended therein. The chemical structure and generation of the brown-color matter will be explained which has absorption spectra similar to those of humic acid.

The brown-color matter was passed through a glass filter of 0.22 micrometer in pore size. As the bacteria were blocked by the filter, a resultant filtrate comprised the brown-color matter and an undecomposed portion of the organic matter. The brown-color matter is thus identified by measuring TOC of the filtrate. Also, the undecomposed portion of the organic matter can be removed by subjecting it to complete decomposition. The remaining after the removal must be the brown-color matter. More specifically, the brown-color matter is hardly decomposed by the action of the specific bacteria selectively raised according to the method of the present invention and the remaining substance after the removal of the bacteria (by filtering them with the 0.22-micrometer glass filter) is identical to the brown-color matter.

It was also verified through a series of experiments conducted by the inventors that the specific bacteria selectively raised in organic wastewater by the method of the present invention can stay in effective, sound survival conditions when combined with a large amount of the brown-color matter.

As shown in FIG. 12, 5,000 to 7,000 ppm of the organic carbon was loaded in the wastewater treatment tank, of which 1,000 ppm was brown-color matter. The brown-color matter remained constant in volume without abrupt increase or decrease during the treatment and was found to comprise a group of phenolic compounds with benzene nuclei. It is known that the phenol compounds are widely used for the growth of vegetation while being considered as one of the essential nutrients.

The phenolic compounds have carboxyl, phenol hydroxyl, and amino groups where the hydroxyl groups may be coupled by hydrogen bonding to one another to form a polymer structure. The phenolic compounds are also reactive to form organic complexes with aluminum, iron, and zinc ions, thus accelerating the flocculation in the treatment tank. The reactivity of the phenolic compounds may contribute to the elimination of unpleasant odors derived from, e.g., hydrogen sulfide, amine, and ammonia in the body waste.

The elimination of such unpleasant odors from hydrogen sulfide, amine, and ammonia will now be explained. In common, the sulfide, amine, and ammonia which are hostile to the human sense of smell are produced during the decomposition of body waste. The hydrogen sulfide is, for example, released from rotten eggs and regarded as one of the most hostile or unpleasant odors.

(1) Removal of hydrogen sulfide

The elimination of hydrogen sulfide will first be described.

50 ml of a body-waste-treated liquid from the adjusting tank in a swine farm was put into a conical flask. The flask was sealed off and had a tiny aperture which was kept closed when not used. A hydrogen sulfide detector (made by Gastec) enclosed in a glass tube was inserted through the aperture into the flask for measuring the amount of hydrogen sulfide by suction of air in the flask. Then, various in-process liquids of equal amount (50 ml) were added to the flow control tank liquid for examining a change in the amount of hydrogen sulfide with time.

Figure 15:
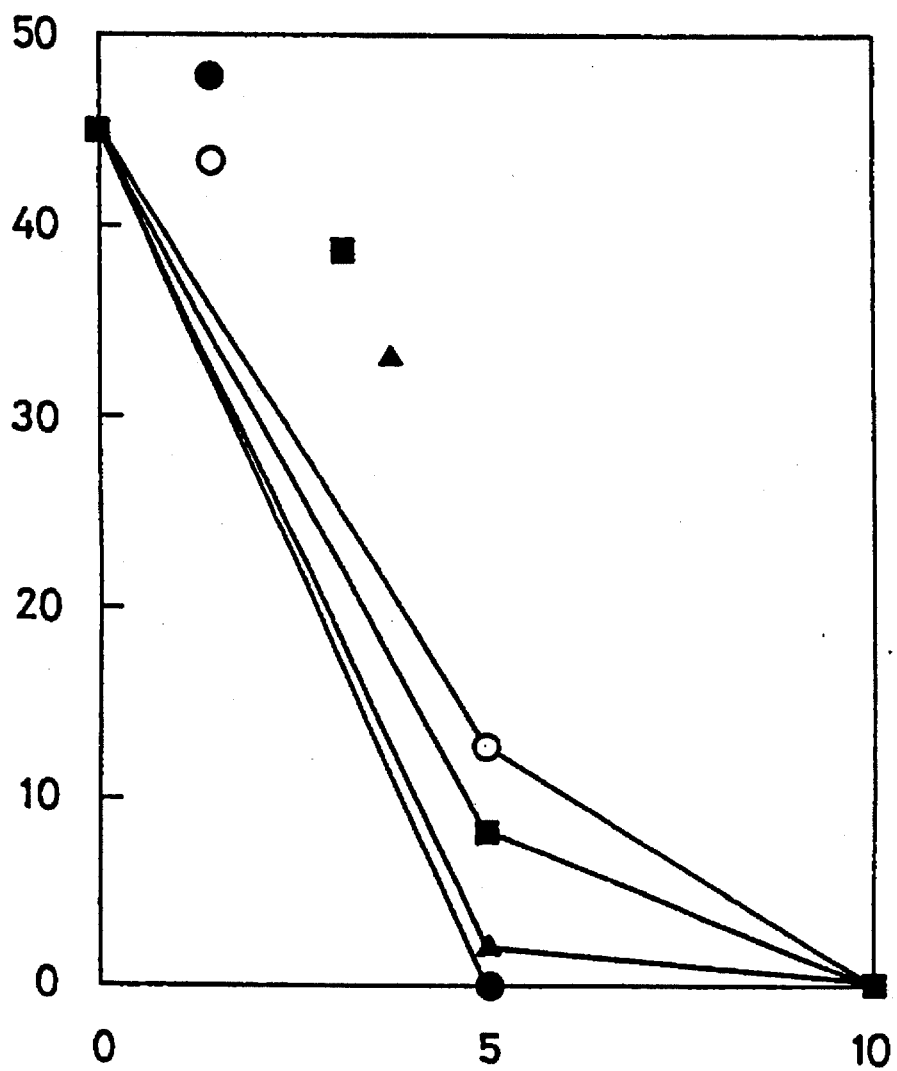
FIG. 15 is a graphic diagram of concentration of hydrogen sulfide versus time showing the elimination of hydrogen sulfide.

As shown in FIG. 15, the hydrogen sulfide was completely eliminated after 5 minutes by the addition of a highly condensed liquid in the treatment tank qualified by the method of the present invention. Also, it was reduced to almost zero after a brown-color sedimentation was introduced. Five to eight minutes after either a liquid in the first aeration tank or a fairly diluted treated liquid was added, only about 12 ppm of hydrogen sulfide were detected. The remaining hydrogen sulfide was then cleared off after 10 minutes. This may be caused by the action of the brown-color matter or phenolic compounds. Because the brown-color sedimentation rarely contained the bacteria, the elimination of hydrogen sulfide was not resulted from the action of the bacteria. The hydrogen sulfide was remarkably decreased when a pellet liquid produced by acid extraction and equal to 1/100 of the raw wastewater was introduced. It is now understood that the brown-color matter having different molecular weights of some hundreds and more were commonly present throughout the above-mentioned cases.

(2) Removal of ammonia

Figure 16:
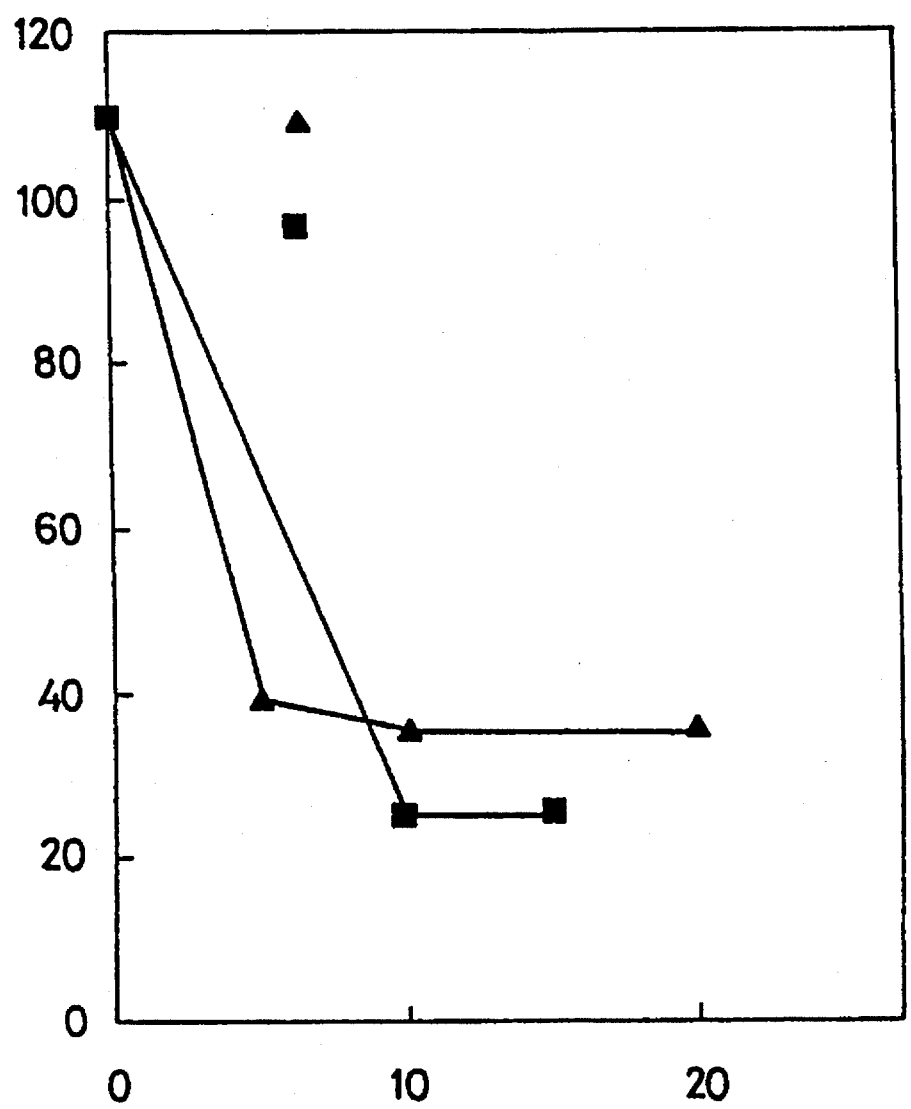
FIG. 16 is a graphic diagram of concentration of ammonia versus time showing reduction in the concentration of ammonia.

The elimination of ammonia was not identical depending on the treated liquids to be added. As shown in FIG. 16, the liquid from the first aeration tank allowed the most amount of ammonia to be eliminated as being followed by the brown-color matter.

(3) Removal of amine

Figure 17:
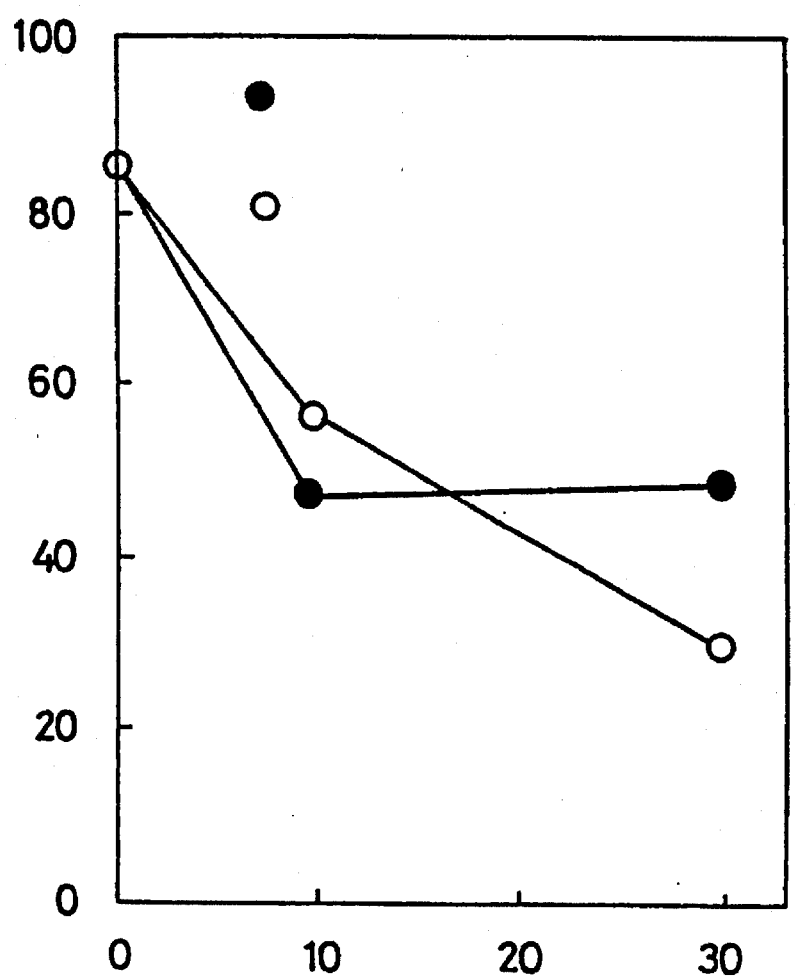
FIG. 17 is a graphic diagram of concentration of amine versus time showing reduction of amine.

FIG. 17 shows the reduction of amine with time. The amount of amine was reduced to nearly 50% 10 minutes after the highly condensed liquid from the treatment tank was added but was no more reduced in concentration. For reduction of the amine, the diluted liquid was found more effective than the highly condensed liquid from the treatment tank.

As set forth above, the specific bacteria selectively raised in the treatment tank by the method of the present invention produce the brown-color phenolic compounds which in turn ensure the stable growth of the bacteria. The brown-color phenolic compounds are also high in the positive chemical activity thus contributing to the elimination of unwanted odor-producing substances including hydrogen sulfide, amine, and ammonia. Furthermore, the brown-color matter forms stable organic complexes with aluminum, iron, and zinc ions and accelerates the flocculation of the bacteria, thus contributing to the removal of excessive bacteria from the settling tank.

The specific bacteria selectively raised by the method of the present invention allow unpleasant odors to be eliminated efficiently and, when used together with 0.2 mM/liter of aluminum ions in a raw refuse decomposer, can decompose waste overnight without producing unpleasant odors but converting to a combination of water, carbon dioxide, and nitrogen gas (and/or nitrous oxide) which can directly be released to the atmosphere. The bacteria according to the method of the present invention is appropriate for use in such a biodegradation-type raw refuse decomposer.

A procedure for identifying the specific bacteria selectively raised by the method of the present invention and capable of absorbing indole was conducted using the cobac reagent. The bacteria were implanted on common agar cultures and raised at 25 degrees centigrade for four days. All colonies of the bacteria were picked up and checked for pure culture. Then, the bacteria were identified according to the procedure of Cowan-Steel.

In the tank with no addition, *Bacillus spp.*, *Pseudomonas spp.*, coryneform bacteria, and *Flavobacterium spp.* were found.

The specific bacteria selectively raised under the presence of a low concentration of aluminum ions by the method of the present invention and proved capable of absorbing and decomposing indole included *Achromobacter spp.*, *Alcaligenes spp.*, *Pseudomonas spp.*, and *Acineobacter spp*. Most of them exhibited capability of nitrate reduction, denitrification, and nitrification.

The bacteria raised in the tank with no addition were similar to those in the conventional activated sludge process. The specific bacteria raised with addition of the mineral and aluminum ions were found different not only in the group but also in the advantageous property from the known bacteria. It is thus assumed that the specific bacteria for optimum use in treatment of a wastewater are selectively raised by the action of a mineral and aluminum ions according to the present invention.

The quality of a resultant treated water was also analyzed in comparison with the untreated wastewater for pH, BOD, SS, and contents of nitrogen and phosphorus, conforming to the JIS rules. The number of colibacilli was measured using a Coli-Count sampler (made by Nippon Millipore Ltd.)

As described above, the tank carrying aluminum ions was filled at high concentration with the specific bacteria capable of nitrate reduction and denitrification and allowed organic matter in the wastewater to be decomposed at a higher efficiency. Accordingly, the organic matter were removed from the tank as converted to carbon dioxide and nitrogen gas (and/or nitrous oxide) and the remaining sludge was less in amount than that produced in the tank with no addition.

FIG. 16 shows a difference in the quality between raw wastewater consisting of swine wastes and effluent after the treatment in treatment tanks with addition of a mineral and aluminum ions.

As shown, the effluent or treated water is qualified as conforming to water quality standards. Effluents to be directly discharged to the environment are strictly controlled by local administrations. For example, the Kyoto prefecture standards and the Setonaikai area regulations (for newly built plants) announce pH of 5.6 to 8.6, BOD of 20 mg/l, SS of 70 mg/l, and colibacilli number of $3000/cm^3$. As is apparent, the measurements in the effluent resulting from the method of the present invention are far below these requirements.

As set forth above, the present invention provides elimination of odor-producing bacteria by the action of a low concentration of aluminum ions and thus allows specific bacteria to decompose organic matter in wastewater without producing unpleasant odors. The specific bacteria which has selectively been raised grow rapidly thus requiring no dilution of the raw wastewater and contributing to the minimum size of a wastewater treatment system.

The addition of a high concentration of aluminum ions after the decomposition accelerates flocculation and precipitation of the specific bacteria producing a clear supernatant which conforms to the effluent standards. Also, the addition of a mineral allows the bacteria to grow in a colony about each piece of the mineral, encouraging the precipitation of the bacteria. Accordingly, the bacteria can be flocculated and removed by adding a lower concentration of aluminum ions.

What is claimed is:

1. A biodegradation process for treating and accelerating the decomposition of organic matter and ammonia in waste water selected from the group consisting of domestic sewage, sanitary sewage, livestock waste and industrial runoff and having a density more than 2000 ppm BOD comprising the steps of:

adding to said waste water in a processing tank, between about 0.1 mM/liter and 0.5 mM/liter of aluminum ions:

a) to selectively and rapidly raise a specific group of bacteria in solution that form phenolic compounds which absorb and decompose unpleasant odor, including ammonia; and concurrently b) to terminate other bacteria in said waste water which produce unpleasant odor, including ammonia, during the decomposition of said organic matter in said waste water;

whereupon after said organic matter is decomposed, said treated water, opaque as a result of said specific group of bacteria which remains suspended in aluminum ion solution, is transferred to a settling tank in which said treated water is subjected to a biodegradation step by adding thereto more than 4 mM/liter of aluminum ions to form aluminum hydroxide flocculate and precipitating said suspended specific group of bacteria which settles as sludge at the bottom of said tank, said biodegradation process resulting in a substantially clear supernatant.

2. The biodegradation process of treating an organic wastewater according to claim 1, further comprising the step of:

adding an amount of aluminum ions so that a concentration of about between 0.1 mM/liter and 0.5 mM/liter is maintained during the biodegradation process.

3. The biodegradation process for treating an organic wastewater according to claim 1, wherein the raised bacteria eliminate odor from the group consisting of indole, scatole and p-cresol.

4. The biodegradation process defined in claim 1 wherein said specific group of bacteria in solution is selected from the group consisting of *Achromobacter spp.*, *Alcaligenes spp.*, *Pseudomonas sp.*, and *Acineobacter, spp.*

5. The biedegradation process defined in claim 2, wherein said specific group of bacteria which synthesizes said organic matter to form said phenolic compounds eliminates hydrogen sulfide amine and ammonia odors.

6. The biodegradation process defined in claim 4, wherein the concentration of aluminum ions is more than 1 mM/liter in the wastewater biodegradation step.

7. The biodegradation process defined in claim 1, wherein during said biodegradation step an ion exchange material is added to said treated wastewater to grow said specific bacteria group in a colony about said ion exchange material to increase flocculent precipitates of said bacteria.

* * * * *